(12) United States Patent
Schmid et al.

(10) Patent No.: US 8,092,863 B2
(45) Date of Patent: Jan. 10, 2012

(54) METHOD FOR MANUFACTURING LIGHTWEIGHT BUILDING BOARDS

(75) Inventors: Johannes Schmid, Starzach/Wachendorf (DE); Achim Gauss, Dornstetten/Hallwangen (DE)

(73) Assignee: Homag Holzbearbeitungssysteme AG (DE)

(*) Notice: Subject to any disclaimer, the term of this patent is extended or adjusted under 35 U.S.C. 154(b) by 861 days.

(21) Appl. No.: 12/118,370

(22) Filed: May 9, 2008

(65) Prior Publication Data

US 2008/0280089 A1    Nov. 13, 2008

(30) Foreign Application Priority Data

May 11, 2007 (EP) .................................... 07009521

(51) Int. Cl.
*B05D 3/12* (2006.01)
(52) U.S. Cl. .......... 427/291; 427/235; 427/290; 428/43; 83/861
(58) Field of Classification Search .................. 427/290, 427/291, 235; 83/861
See application file for complete search history.

(56) References Cited

U.S. PATENT DOCUMENTS

| 4,378,170 | A |   | 3/1983  | Orr |         |
|-----------|---|---|---------|---------|---------|
| 5,688,602 | A | * | 11/1997 | Ghahary | 428/481 |
| 7,007,317 | B1| * | 3/2006  | Brown   | 4/631   |

FOREIGN PATENT DOCUMENTS

| DE | 10 2004 010 873 | 9/2005 |
| EP | 1 574 264 | 9/2005 |
| EP | 1 640 128 | 3/2006 |
| GB | 20 00 465 | 1/1979 |

OTHER PUBLICATIONS

Granicoat Brochure, http://www.safascorp.com/pdfs/prod_granicoat.pdf (last viewed Mar. 4, 2011).*
James G. Bralla, Handbook of Manufacturing Processes, Industrial Press, 2007.*

* cited by examiner

*Primary Examiner* — Michael Cleveland
*Assistant Examiner* — James M Mellott
(74) *Attorney, Agent, or Firm* — Baker Botts L.L.P.

(57) ABSTRACT

The invention relates to methods for manufacturing lightweight building boards (1) starting from a workpiece (2) which comprises two thin-walled cover layers (4, 6) and at least one core layer (8) which is disposed between the cover layers (4, 6) and is made of a light filling material, the at least one core layer (8) possessing cavities and having a lower average density than the cover layers. The method comprises the following steps: forming in the workpiece (2) at least one groove (10) which extends through at least one first cover layer (4) and at least partly through the at least one core layer (8) and circumscribes at least a portion of a contour of the lightweight building board (1) to be manufactured; introducing a hardenable mass (12) into the at least one groove (10); at least partly hardening the hardenable mass (12); and making a separating cut along the at least one groove (10), so the at least partly hardened mass (12) is separated in the longitudinal direction of the groove.

8 Claims, 2 Drawing Sheets

METHOD FOR MANUFACTURING LIGHTWEIGHT BUILDING BOARDS

CROSS-REFERENCE TO RELATED APPLICATIONS

The present application claims the benefit of EP Application No. 07 009 521.1, filed May 11, 2007, which is hereby incorporated by reference in its entirety.

TECHNICAL FIELD

The invention relates to a method for manufacturing lightweight building boards starting from a workpiece which has two thin-walled cover layers and at least one core layer which is disposed between the cover layers and is made of a light filling material, the at least one core layer possessing cavities and having a lower average density than the cover layers.

PRIOR ART

Lightweight building boards of the type in question have widespread applications, for example for the manufacture of doors but increasingly also for the manufacture of table tops or other items of furniture.

A method for the manufacture or refinement of lightweight building boards is disclosed, for example, in EP-A-1640128. In this method, a lightweight building board is first formatted, i.e. cut out of an initial workpiece and brought into the desired crude shape. Subsequently, a recess is milled in the region of the narrow side of the lightweight building board, both into the inside of the cover layers and into the core layer. Finally, a supporting edge, which is provided from the outset or is subsequently provided with a decorative edge, is glued into the recess.

Both the supporting edge and the decorative edge frequently consist of a plastics material. It has been found in this regard that it is difficult to deflect the supporting edge, which is usually thicker in its configuration, in the region of corners or curves of the narrow face of the lightweight building board, so the producible board geometries are limited or have to be worked with a plurality of separate supporting edge portions, leading to a complex procedure.

A further process for providing a supporting edge is disclosed in DE 10 2004 010 873 A1 in which a free-flowing and hardenable material is applied to the narrow face of the lightweight building board in such a way that the material infiltrates cavities in the core layer. For this purpose, use is made of an extruder which is disposed horizontally or located in the workpiece plane and usually has large dimensions. In this case too, the large dimensions of the extruder limit the producible workpiece geometries. For example, sink cutouts for kitchen worktops, U-shaped worktops in the inner region thereof, etc. cannot be machined.

PRESENTATION OF THE INVENTION

The object of the present invention is to provide a method for manufacturing lightweight building boards that allows a broad range of board geometries to be configured using a simple procedure.

According to the invention, this object is achieved by a method for manufacturing lightweight building boards according to claim 1. Particularly advantageous developments of the invention form the subject-matter of the dependent claims.

The invention is based on the idea not of regarding the formatting of the lightweight building board from a workpiece and the introduction of a supporting edge in the region of a narrow face as sequential method steps but rather of drawing them together and combining them in a beneficial manner.

Against this background, the method according to the invention has the following method steps:
forming in the workpiece at least one groove which extends through at least one first cover layer and at least partly through the at least one core layer and circumscribes at least a portion of a contour of the lightweight building board to be manufactured,
introducing a hardenable mass into the at least one groove,
at least partly hardening the hardenable mass, and
making a separating cut along the at least one groove, so the at least partly hardened mass is separated in the longitudinal direction of the groove.

In this way, it is possible to manufacture, without complex measures or losses of quality, lightweight building boards having almost any desired geometry or contour. The at least one groove acts in this regard as a "casing" which ensures that the hardenable mass can reliably infiltrate cavities in the core layer and optionally pores in the cover layer(s) and thus stabilise and seal the lightweight building board in the edge region. In the above-mentioned prior art according to DE 10 2004 010 873 A1, this required complex measures and the hardenable mass had to comply with narrow tolerances in terms of its consistency and hardening speed. This is no longer the case in the method according to the invention.

In addition, the method according to the invention can be carried out using simple means which in the field of wood machining are generally available anyway and can be disposed in a compact manner.

In order to achieve particularly effective sealing and rigidity at the edge regions of the lightweight building board, a development of the invention provides for the at least one groove to reach right through the at least one core layer and preferably at least partly into the second cover layer.

Within the scope of the present invention, the cross-sectional shape of the at least one groove is not particularly limited and can have a broad range of configurations. With regard to ease of manufacture, it has proven advantageous for the at least one groove to be substantially U-shaped in cross section.

Within the scope of the present invention, in principle any groove can adjoin only one single lightweight building board to be manufactured. However, in order to minimise wastage in the manufacture of a plurality of lightweight building boards starting from a specific initial workpiece, a development of the invention provides for the at least one groove to adjoin within the workpiece at least two lightweight building boards to be manufactured. The grooves within a workpiece can thus be disposed, for example, in the manner of a chessboard pattern, so each groove adjoins two workpieces. However, a broad range of other types of configurations and disposals are also conceivable in order to obtain a maximum number of lightweight building boards from a specific workpiece and to minimise wastage.

In some applications, it may be sufficient only partly to fill the respective groove with the hardenable mass. However, with regard to a beneficial sealing and stabilising effect of the hardenable mass, it has proven advantageous for the hardenable mass to be introduced, according to a development of the invention, into the at least one groove in such a way that at least the adjoining core layer is completely covered by the mass.

In principle, the separating cut can be made at any desired location completely or partly within the groove. A development of the invention provides in this regard for the separating cut to be made at the edge of the groove completely or partly within the groove, so after the separating cut only minor reworking is required, whereas at the same time a beneficial sealing and stabilising effect of the workpiece is achieved.

Depending on the nature of the hardenable mass used, a lightweight building board which is manufactured using the above-described method can itself be a finished product. Alternatively, a development of the invention provides for the surface of the at least partly hardened mass to be subjected, after the making of the separating cut, to at least one further method step which is selected from machining, in particular material-removing machining, patterning, coating and applying a decorative edge. This allows the manufacture of a particularly high-quality and versatile lightweight building board.

DETAILED DESCRIPTION OF PREFERRED EMBODIMENTS

Preferred embodiments of the present invention will be described hereinafter in detail with reference to the accompanying drawings.

Figure 1:
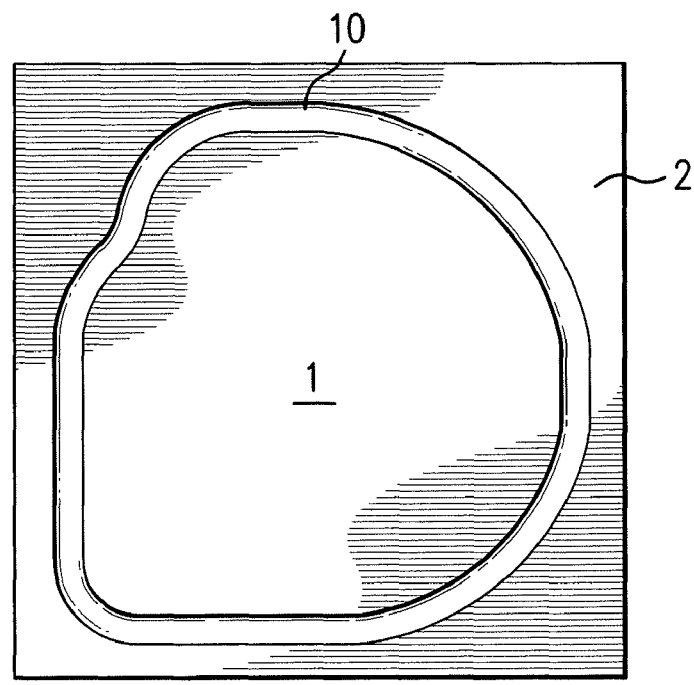
FIG. 1 is a schematic plan view of a workpiece comprising a groove for manufacturing a lightweight building board as an embodiment of the present invention.
Figure 2:
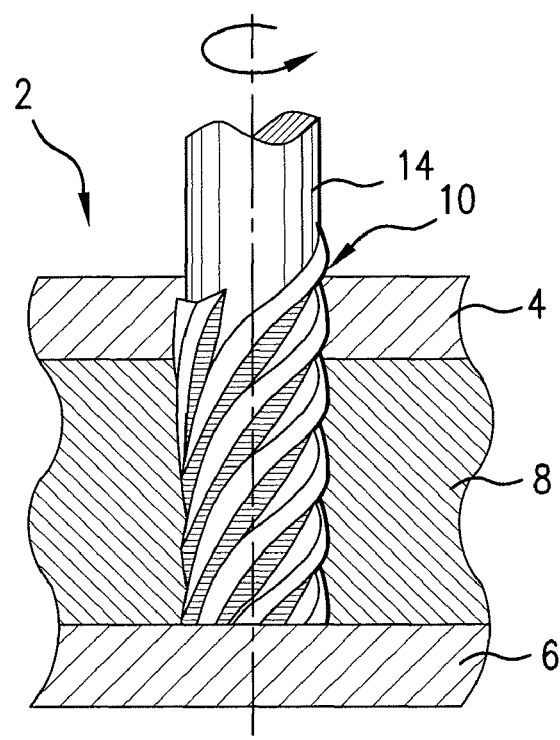
FIG. 2 is a schematic partial cross section of the workpiece shown in FIG. 1 with a workpiece for machining.

The invention relates to the manufacture of lightweight building boards starting from a workpiece which is shown schematically in FIG. 1 and FIG. 2. The workpiece 2 is a lightweight building board workpiece which in the present embodiment comprises two thin-walled cover layers 4, 6 and a core layer 8 disposed between the cover layers. The core layer 8 is in the present embodiment a honeycomb material made of paper or cardboard and comprising cavities which extend from one cover layer 4 to the other cover layer 6. The cover layers 4 and 6 are, on the other hand, in the present embodiment made of a particle board material, so the core layer 8 has a much lower average density than the cover layers 4 and 6. It will however be noted that the materials of the cover layers and the core layer are not particularly limited within the scope of the present invention and, for example, various plastics or metal-based materials can also be used.

As may be seen in FIG. 1, the workpiece 2 can be preproduced as an extensive board having, for example, dimensions of 2 m×6 m. The method according to the invention can be used to manufacture one or more lightweight building boards 1 from any workpiece 2 of this type, wherein a preferred embodiment of the method according to the invention will be described hereinafter.

Firstly, as may be seen in FIG. 1 and FIG. 2, for each lightweight building board 1 to be manufactured, at least one groove 10 is formed in the workpiece 2, for example by means of a milling cutter 14 shown schematically in FIG. 2. The use of a milling cutter of this type produces a groove 10 having a substantially U-shaped cross section. It will however be noted that use may also be made of other types of milling cutters or machining technologies which yield different groove cross sections.

The groove 10 is in this regard formed in such a way that it extends both through the first cover layer 4 (the upper cover layer in FIG. 2) and right through the core layer 8 (cf. also FIG. 2). In some cases, it can also be beneficial to make the groove into the cover layer 6, although this is not shown in the present document. As may be seen in FIG. 1, the groove 10 circumscribes the contour of the lightweight building board 1 to be manufactured.

Figure 3:
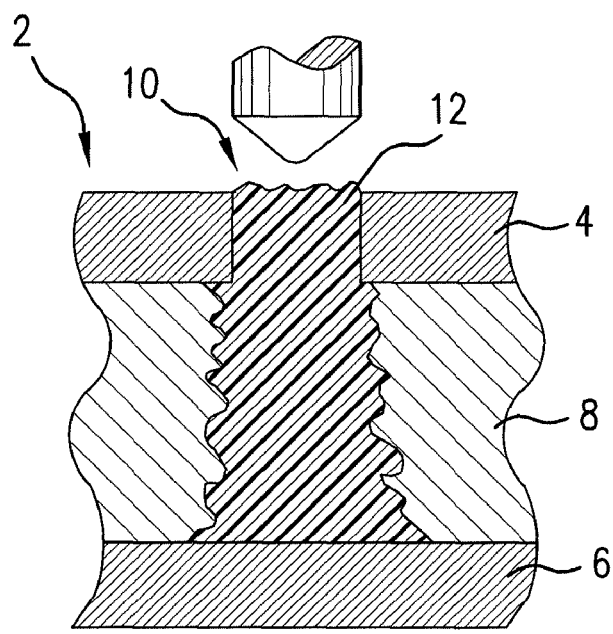
FIG. 3 is a schematic partial cross section of the workpiece shown in FIG. 1 in a further method step.

Once the groove 10 has been formed and optionally cleaned (for example blown out), the groove is filled with a hardenable mass 12 (FIG. 3), for example a polyurethane foam. Within the scope of the present invention, the hardenable mass used may be a broad range of materials which advantageously have a high flow capacity, thus allowing the hardenable mass 12 to infiltrate, during introduction into the groove 10, the cavities in the core layer 8 that face the groove. In this regard, the groove 10 is in the present embodiment completely filled with the hardenable mass 12 although, depending on the application, partial filling of the groove may also be sufficient. However, in this case, usually at least the core layer 8 should be completely covered by the mass 12 in order to achieve a beneficial sealing and stabilising effect.

Subsequently, the hardenable mass 12 is hardened, for example by waiting for a predetermined period of time or, if appropriate, additionally accelerating the hardening, for example by means of UV radiation, heat, refrigeration, etc.

Once the mass 12 has reached a sufficient degree of hardening, the lightweight building board 1 is cut out of the workpiece 2 by making a separating cut along the groove 10, for example by means of a saw. In this regard, the separating cut can for example be made in such a way that the narrow face configuration, shown in cross section in FIG. 4, of the lightweight building board 1 is immediately obtained. In other words, the separating cut is made at the edge of the groove 10, either completely or at least partly within the groove.

Figure 4:
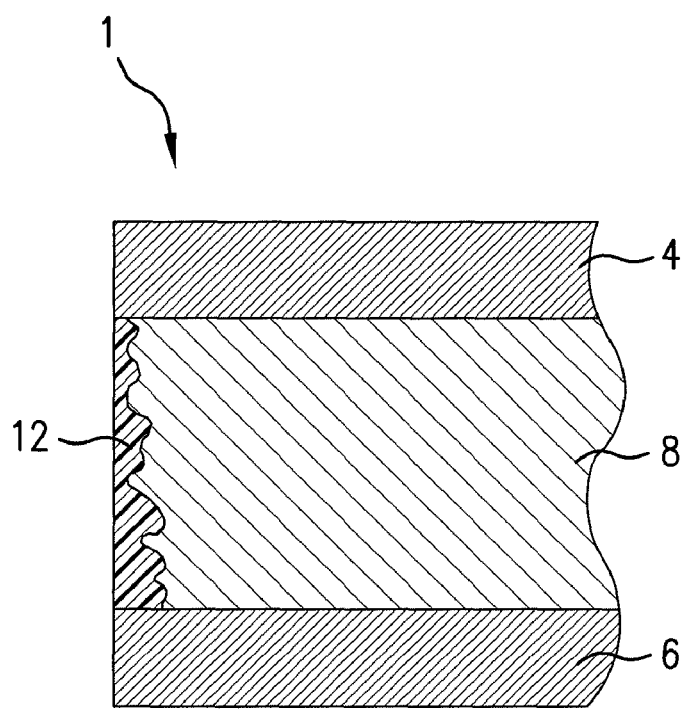
FIG. 4 is a schematic partial cross section of a lightweight building board as a preferred embodiment of the present invention.

This narrow face shown in FIG. 4 can subsequently be subjected to further refinement steps such as, for example, surface grinding, subsequent priming, then imprinting or, if appropriate, application of a decorative edge, although all of these steps are obviously optional.

Although not shown in the figures, the method according to the invention also allows a plurality of lightweight building boards 1 to be obtained from a workpiece 2. In this regard, separate grooves 10 can be formed for each lightweight building board 1. However, within the scope of the invention, it is preferable for the grooves 10 in adjacent workpieces 1 to be drawn together where possible; this minimises not only wastage but also labour.

Furthermore, although not shown in the figures, the method according to the invention can advantageously be used also to form a cutout within the respective lightweight building board 1, for example for insertion of a sink or stove. In this case, the respective groove 10 is formed not on an outer contour but rather on an inner contour of the lightweight building board 1.

The invention claimed is:

1. A method for manufacturing lightweight building boards, comprising the steps of:

providing a workpiece which comprises two thin-walled cover layers and at least one core layer which is disposed between the cover layers and is made of a light filling material, the at least one core layer possessing cavities and having a lower average density than the cover layers, forming in the workpiece at least one groove which extends through at least one first cover layer and at least partly through the at least one core layer and circumscribes at least a portion of a contour of the lightweight building board to be manufactured, the at least one groove exposing first and second opposing edges of the workpiece, introducing a hardenable mass into the at least one groove, at least partly hardening the hardenable mass, and making a separating cut along the at least one groove, so the at least partly hardened mass is separated in the longitudinal direction of the groove, such that the hardenable mass covers the first and second opposing edges after separation.

2. A method according to claim 1, wherein the at least one groove reaches right through the at least one core layer.

3. A method according to claim 2, characterised in that the at least one groove reaches at least partly into the second cover layer.

4. A method according to claim 1, wherein that the at least one groove is substantially U-shaped in cross section.

5. A method according to claim 1, wherein the at least one groove adjoins within the workpiece at least two lightweight building boards to be manufactured.

6. A method according to claim 1, wherein the hardenable mass is introduced into the at least one groove in such a way that at least the adjoining core layer is completely covered by the mass.

7. A method according to claim 1, wherein the separating cut is made at the edge of the groove completely or partly within the groove.

8. A method according to claim 1, wherein the surface of the at least partly hardened mass is subjected, after the making of the separating cut, to at least one further method step which is selected from machining, in particular material-removing machining, patterning, coating and applying a decorative edge.

* * * * *